May 6, 1969 W. F. NEWBOLD 3,443,235

ELECTRICAL APPARATUS

Filed Feb. 19, 1965 Sheet 1 of 5

INVENTOR.
WILLIAM F. NEWBOLD

BY Arthur H. Swanson

ATTORNEY

May 6, 1969 W. F. NEWBOLD 3,443,235

ELECTRICAL APPARATUS

Filed Feb. 19, 1965

Sheet 2 of 5

INVENTOR.
WILLIAM F. NEWBOLD

BY Arthur H. Swanson

ATTORNEY

INVENTOR.
WILLIAM F. NEWBOLD
BY
Arthur H. Swanson
ATTORNEY

INVENTOR.
WILLIAM F. NEWBOLD
BY Arthur H. Swanson
ATTORNEY

May 6, 1969 W. F. NEWBOLD 3,443,235

ELECTRICAL APPARATUS

Filed Feb. 19, 1965 Sheet 5 of 5

INVENTOR.
WILLIAM F. NEWBOLD

BY Arthur H. Swanson

ATTORNEY

United States Patent Office 3,443,235

Patented May 6, 1969

3,443,235

ELECTRICAL APPARATUS

William F. Newbold, Springfield Township, Montgomery County, Pa., assignor to Honeywell Inc., Minneapolis, Minn., a corporation of Delaware Filed Feb. 19, 1965, Ser. No. 433,875
Int. Cl. H03f 1/02
U.S. Cl. 330—9 14 Claims

ABSTRACT OF THE DISCLOSURE

A controller amplifier within an electronic controlling apparatus is time-shared between a plurality of input signal devices and a plurality of static memory devices individually associated therewith. Switches provide the time-sharing by connecting each input device and its associated memory device respectively to the input and output of the controller amplifier. Separate time-shared circuits are provided to compensate the amplifier for current and voltage drift. The amplifier is then connected to a plurality of further input and memory devices which, in turn, connect to utilization devices for controlling a process. These utilization devices may be switched from the amplifier to a manual controller and back again without disturbing the process being controlled.

In modern measuring and/or controlling systems, wherein the heart of the control apparatus is a high quality electronic amplifier, the cost of the amplifier itself is a major element of the expense of the control system. In such control systems it is not unusual to have a large number of individual control loops with each control loop including its own individual controller amplifier. Accordingly, a system which includes a large number of control loops tends to become prohibitively expensive. Efforts have been made, however, to reduce the system cost by providing scanning means whereby a single high quality amplifier is time-shared among a plurality of individual control loop functions. The time-sharing of the single amplifier among the several controller functions introduces a number of other problems, such for example, as the stabilization of the amplifier against drift in both current and voltage modes, in direct current circuit applications. Another problem that is introduced is the adaptation of the system to the response to an output of continuous signals while the amplifier itself is associated with each individual loop only intermittently. A further problem that is introduced results from the need for providing a manual as well as an automatic mode of operation and the desirability of effecting the shift between the manual and automatic modes of operation without upset to or disturbance of the process variable or variables under control.

A specific object of the present invention, therefore, is to provide an improved control system as set forth and characterized in that a single amplifier is employed in a time-sharing configuration in a plurality of control loop functions.

A further object of the invention is to provide, in an improved control system as set forth, improved means for stabilizing an electronic amplifier against current and voltage drift which are intolerable in many applications encountered in the practical application of a measuring and/or control system of the type here involved.

Such current and voltage stabilization can be effected in an extremely short interval of time compared to the time the amplifier is available to perform the desired measurement and controlling functions. The performance of the stabilizing operations, therefore, has no adverse effect upon the measuring and controlling operation of the system in which the amplifier is employed. The current and voltage stabilization of the type herein contemplated is especially suited for use in a time-shared amplifier configuration requiring only the addition of two more inputs, one for current and the other for voltage stabilization.

A still further object of the invention is to provide improved memory means for each of the plurality of control function loops in a multiple indicating, recording and controlling system incorporating the single time-shared amplifier.

Another object of the invention is to provide an improved output amplifier stage which includes features of simplicity of construction and operation and great versatility of application.

A further object of the invention is to provide an improved control system providing manual and automatic control modes of operation wherein shifting between these modes is accomplished without upset to or disturbance of the process variable under control without requiring the manual balancing of values when switching from one mode to the other.

A more specific object of the invention is to provide an improved multiple control system of the type referred to wherein provisions are included for shaping the frequency response characteristics of the various components of the system so as to make the overall frequency response characteristic of the system commensurate with the requirements imposed by the use of a time-shared common amplifier and the sample interval employed.

In accomplishing these and other objects there has been provided, in accordance with the present invention, an improved industrial process control system wherein a single high quality amplifier is used in a time-sharing configuration in a plurality of control loops for a plurality of control loop functions. To this end scanning means are provided for sequentially connecting, on a cyclically repeated basis, a plurality of pairs of input and output circuits to the time-shared amplifier. At least two points on the scanning cycle are reserved for effectiing a D.C. stabilization of the time-shared amplifier with respect to current and voltage. Suitable memory means are provided for each of these functions to maintain the stability of the amplifier during the remainder of the scanning cycle. During this remainder of each scanning cycle, the selected input circuits, such a process variable signals or derived error signals, are selectively and sequentially applied as input signals to the time-shared amplifier; while corresponding output circuits, including individually associated memory devices, are similarly and simultaneously connected to the output of the time-shared amplifier. The recited memory devices associated with the respective output circuits are so designed as to accept the intermittently applied signal from the amplifier and to provide a continuous output signal at a substantially constant value until such time as a new signal is applied thereto from the time-shared amplifier.

A better understanding of this inventon may be had from the following detailed description when read in connection with the accompanying drawings, in which.

Figure 1:
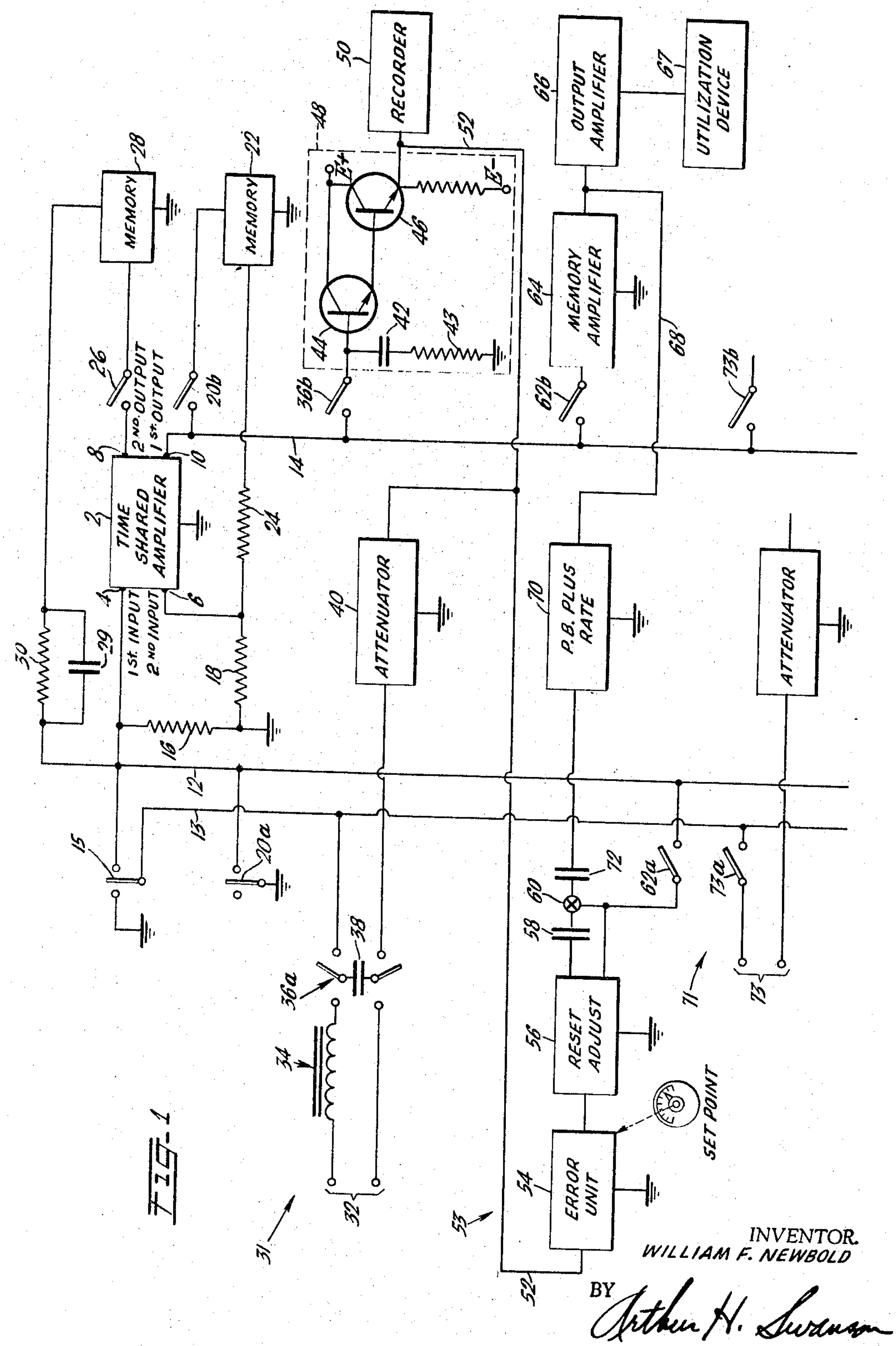
FIG. 1 is a schematic diagram of a multi-control loop industrial process control system featuring a time-shared amplifier and embodying the present invention.

Referring now to the drawings in more detail, there is shown in FIG. 1 a high gain direct current difference amplifier 2 having a first input terminal 4 and a second input terminal 6. The amplifier is also provided with a second output terminal 8, associated with the second input terminal 6, and a first output terminal 10, associated with the first input terminal 4. The input terminal 4 is connected to a common input lead 12. Similarly, the output terminal 10 is connected to a common output lead 14. As will more fully appear hereinafter, it is to be noted that the input terminals 4 and 6 are independent of each other, each being referred to ground or input common. Similarly, the output terminals 8 and 10 are independent of each other, each being referred to ground or an output common. Input terminal 6 and output terminal 8 form a first amplifier channel, while input terminal 4 and output terminal 10 form a second amplifier channel. In the illustrated circuit a shunt input impedance resistor 16 is connected between the input terminal 4 and ground. Similarly, a resistor 18 is serially connected between the input terminal 6 and ground. The output terminal 10, which hereafter is referred to as the voltage output terminal, is connected to a memory unit 22 through a first output switch **20*b* of a plurality of sequentially actuated output switches. The output of the memory 22 is connected through a feedback resistor 24 to the input terminal 6 of the amplifier 2. A first input switch 20*a* of a plurality of input switches is arranged to be actuated by means, not shown, in synchronous relationship with the output switch 20*b* to connect the common input lead 12, and hence the input terminal 4, directly to ground. The output terminal 8, hereafter referred to as the current output terminal, is similarly connected to a memory 28 through a second switch 26 of the series of sequentially operated output switches. The output of the memory 28 is connected through a feedback resistor 30 shunted by a capacitor 29 to the input terminal 4 of the amplifier 2. Elements thus far described in association with the time-shared amplifier are those elements associated with the current and voltage stabilization of the amplifier as will be more fully described hereinafter. The memory units 22 and 28 are each shown in FIG. 1 as including solely a corresponding memory capacitor. In certain applications, however, the memory units 22 and 28** may take the form illustrated in FIG. 2 and described in connection with that figure.

One of the control loop functions which may be required of the time-shared amplifier in a typical industrial process control application is that of the conversion of a measured process variable signal, which may be on the order of magnitude of millivolts, into a signal of proper magnitude for feeding to the input of a process controller, which latter signal may be in the order of magnitude of volts. A process variable signal of this type may be such as that derived from a thermocouple or other millivolt output transducer. One feature which has become increasingly important in such conversion means in industrial process control applications is the provision of means for conductively isolating the measuring circuits from the signal processing circuit. To this end there is provided a conversion unit indicated at 31 comprising a pair of input terminals 32 which may be directly connected to a measuring circuit for applying to said terminals 32 a first process variable signal. The terminals 32 are connected, through a series connected inductive choke 34 to a pair of fixed input contacts of a double-pole double-throw switch **36*a*. The movable blades of the switch 36*a* are connected to opposite electrodes of an input storage capacitor 38 which may be referred to as a "flying capacitor." The upper one of the two fixed output contacts of the switch 36*a* is connected to a common lead 13 which, in turn, is connected through switch 15 to the common input lead 12 and thereby to the amplifier input terminal 4. The remaining fixed output contact of the switch 36*a* is connected through an attenuator 40 in feedback relation to the corresponding output circuit for the conversion unit 31**.

The switch 15 is a single-pole double-throw switch having its movable blade connected to the lead 13 and having one of its contacts connected to the lead 12. The remaining contact of the switch 15 is connected to ground. The blade of the switch 15 is operated with the switches **20*a*, 20*b*, 36*a*, 36*b*, etc. in such a manner that the lead 13 is connected to the lead 12 when and only when the conversion unit 31 or when any other conversion unit included in the overall system has its switch 36*a* connected to apply the charge on its associated capacitor 38 to the common lead 13. At all other times the switch 15 connects the lead 13 directly to ground thereby preventing any alternating stray signal, which may be superimposed on the millivolt signal under measurement, from being applied to the common lead 12 where it would tend to affect other signals on the lead 12 as they are successively applied to the input of amplifier 2. Were the switch 15 and separate common lead 13 not provided, such stray alternating signals introduced at terminals 32 might pass through the capacitive leakage of the switch 36*a* even though its movable blades were in the position wherein the capacitor 38 is not connected to the input of time-shared amplifier 2. Such stray signals do not interfere with the operation of the system when the switch 36*a* is applying the charge on the capacitor 38 to the input of amplifier 2 since such stray signals are at that time shunted by the relatively low impedance of the capacitor 38. Thus the switch 15 and the separate common lead 13** serve an important practical purpose of permitting process variable inputs subject to alternating stray signals to be handled by the same amplifier controller mechanism that handles other inputs not subject to stray signals without adverse effect by such stray signals and without requiring special filtering provisions for the inputs introducing the stray signals.

As shown, the output circuit of the conversion means is connected through an output switch **36*b* to the common output lead 14. The switch 36*b* operates synchronously with the operation of the switch 36*a* in the input circuit. The output circuit thus referred to includes a memory amplifier 48 having a high quality storage capacitor 42 connected between the output side of the switch 36*b* and ground through a resistor 43. The ungrounded side of the capacitor is also connected to the base of a transistor 44. Transistor 44 and an associated transistor 46** are connected as described and illustrated in United States Patent No. 2,663,806, by Darlington, which issued Dec. 22, 1953 from a filing date of May 3, 1952. This circuit is known as a Darlington amplifier.

The output of the memory amplifier 48 is connected to a recorder 50 to provide a record of the variations in the process variable signal. The output of the memory amplifier 48 is also connected through a lead 52 first to the attenuator 40 to provide a feedback signal for the input storage capacitor 38, and second as input signal to a control loop indicated at 53.

The control loop 53 includes, first, an error unit 54 wherein the signal representing the process variable is compared with a setpoint or reference signal to produce an error or deviation signal. The output of the error unit 54 is connected to a reset adjustment network 56 which is, in turn, connected to an input capacitor 58. The input capacitor 58 is, in turn, connected to a summing junction 60. The summing junction 60 is connected through an input switch **62*a* to the input common lead 12. The output common lead 14 is connected through an output switch 62*b* to a memory amplifier 64. The output of the memory amplifier 64 is connected to an output amplifier 66 and also to a feedback circuit by way of a lead 68. The feedback circuit includes a proportional band (P.B.) adjustment and a rate of change (Rate) circuit 70 the output of which is connected to a feedback capacitor 72. The other side of the feedback capacitor 72 is connected to the summing junction 60. In actual practice, as will appear more fully hereinafter, the ratio of the capacitance of the capacitors 58 and 72** respectively establishes the basic proportional band characteristic of the controller.

The P.B. adjustment referred to in connection with the circuit 70 in the feedback path provides an adjustment within the basic band established by the ratio of the capacitors 58 and 72. Similarly, the reset characteristics of the controller are established by the capacitance of the capacitors 58 and 72 in conjunction with the impedance adjustment of the reset adjusting network 56.

It will be understood that the several loop circuits shown in FIG. 1 are by way of example only; and additional, similar input circuits and corresponding output circuits may be connected to the common input and output leads 12 and 14, respectively, in the manner herein illustrated. In practice, inputs appropriate for direct application to the input of the time-shared amplifier 2 are often employed. A typical one of such inputs is shown at 71 as including input terminals 73 and an input switch 73*a*. It will be understood that an output switch 73*b* arranged for synchronous operation with this input switch 73*a* will also be provided with such a type of an input.

In operation, the switches 20*a*, 20*b*, 26, 36*a*, 36*b*, 62*a*, and 62*b*, and such other switches as may be employed to connect other functional circuits connected to the common leads 12 and 14, are operated in a parallel synchronous relationship. That is, one pair of switches at a time is closed in synchronous relationship, all other switches during that interval being open. Synchronous relationship means the closure of the pair of switches in an overlapping manner, for example, the input switch 20*a* is first closed and then the output switch 20*b* is closed a short time interval later. Upon opening of the pair of switches, the output switch 20*b* is first opened and then a short time interval later the input switch 20*a* is opened. Each pair of switches is operated in this synchronous relationship manner. The next pair of switches in the sequence is closed when both switches of the first pair have been opened and so on in sequence to complete a full cycle. In this connection, it should be noted that switch 26 does not have a corresponding input switch but does take its turn in the switching sequence.

To initiate the sequence, the switch 20*a* is closed for short-circuiting the input lead 12 to ground and producing a zero input signal to the time-shared amplifier 2. While switch 20*a* is closed the switch 20*b* is closed connecting the voltage output terminal 10 of the time-shared amplifier 2 to the memory unit 22. If the time-shared amplifier 2 were free from drift signal while the switch 29*a* was closed, there would be zero output signal at terminal 10 for application to the memory unit 22. All direct current amplifiers, however, exhibit a measure of drift. When there is a drift signal present in the amplifier 2, a corresponding voltage signal appears at the terminal 10 for application to the memory unit 22 upon closure of the switch 20*b*. The switches 20*a* and 20*b* may then be opened, and the voltage signal which had been applied to the memory 22 is divided by the ratio of the resistors 18 and 24 and applied to the input terminal 6 of the time-shared amplifier 2 in a direction to compensate for the voltage drift characteristic of the amplifier. It should be noted that the time constant of the memory circuit 22 is sufficiently long to maintain the compensating signal applied to the input terminal 6 substantially constant until the scanning cycle of the switches has been completed and the voltage drift characteristic of the amplifier is again sampled. As will be seen from FIG. 1, the voltage stabilization circuit produces across resistor 18 a voltage which is equal to $$e_d \cdot G \cdot \frac{R_{18}}{R_{18}+R_{24}}$$

where $e_d$ is the drift voltage in the amplifier, G is the amplifier gain, and $R_{18}$ and $R_{24}$ are the respective resistances of the resistors 18 and 24. The operation of the voltage stabilization circuit may be further described by consideration of a typical operating example. Upon the assumption that the amplifier 2 has a gain G of $10^6$, and that the ratio of the resistances of the resistors 18 and 24 are such that $$\frac{R_{18}}{R_{18}+R_{24}}=\frac{1}{1000}$$

then $e_d$, the drift voltage, is balanced out to 99.9%.

With the amplifier thus stabilized with respect to drift voltage in the amplifier 2, the next point in the scanning sequence would be to close switch 26 with all other switches opened. In such condition the current output terminal 8 of the time-shared amplifier 2 is connected to the memory unit 28. The only signal then appearing at the output terminal 8 of the amplifier 2 is that resulting from the current drift characteristic of the amplifier 2. The output of the memory unit 28 is divided by the resistors 30 and 16 and applied to the input terminal 4 of the time-shared amplifier 2, thus compensating the amplifier for current drift characteristic. Again, the time constant characteristic of the memory unit 28 is sufficiently long to maintain the compensating signal on input terminal 4 substantially constant during the entire scanning cycle of the system.

In explaining the operation of the current stabilization circuit just described, it is noted that when the input to the amplifier 2 is opened and output switch 26 is closed, the voltage across the memory capacitor in the memory unit 28 will assume a value of $$\frac{R_{16}G}{R_{16}+R_{30}}$$

where G is the gain of amplifier 2 and $R_{16}$ and $R_{30}$ are the respective resistances of the resistors $R_{16}$ and $R_{30}$. If $$\frac{R_{16}}{R_{16}+R_{30}}=\frac{1}{10}, \text{ then } \frac{R_{16}G}{R_{16}+R_{30}}=10$$

The drift current is supplied from the capacitor of the memory 28 through the resistor 30 to buck the existing current to a degree of 99.999%, or an improvement of $10^5$.

When the switch 26 has opened, the input to the amplifier 2 is arranged to be connected in sequence to the successive controller functions. Switch 36*a* and the other switches connected to such comparable input circuits as that shown associated with switch 36*a* are normally closed on the fixed contacts connected directly to the process variable signal source. Under that condition the capacitor 38 is charged to a value representative of the value of the process variable signal. After the opening of switch 26 in the current stabilization circuit, the movable blades of the switch 36*a* are transferred from the input contacts to the output contacts for connecting the capacitor 38 between the input common lead 12, as switch 15 is moved to the right, and the feedback attenuator circuit 40. When the input switch 36*a* has been so actuated, the output switch 36*b* closes in synchronous relationship therewith. The actuation of the switch 36*a* applies an input signal representative of the magnitude of a first process variable to the input of the time-shared amplifier 2. The closing of the switch 36*b* connects the amplified output of the time-shared amplifier 2 to the memory amplifier 48 including the capacitor 42 and the transistors 44 and 46. After a predetermined short period during which the switches 36*a* and 36*b* are closed these switches are again opened.

Notwithstanding the short time duration of the application of the signal from the time-shared amplifier 2 to the memory amplifier 48, the memory amplifier 48 stores the amplified information and produces a continuous output signal to the recorder 50 and the lead 52. The connection of the attenuator 40 between the lead 52 and the lower terminal of the input switch 36*a* reduces the output signal to an order of magnitude commensurate with the magnitude of the input signal, and this attenuated output signal is applied to the capacitor 38 in negative feedback relationship to effect the desired gain stabilization of the time-shared amplifier 2 for the individual loop.

The lead 52 is also connected to the input of the error unit 54 of the control loop 53. As previously mentioned, the error unit 54 is a comparison circuit which compares a set point signal with the amplified process variable signal from the preceding memory amplifier 48. The set point signal may be derived from a local set point signal source or may be derived from a remote set point source, as will be more fully shown in connection with FIG. 4. The output of the error unit 54 comprises an error signal or deviation signal which is the difference between the process variable signal and the set point signal. The reset adjustment unit 56 to which the error or deviation signal is applied comprises a resistance network, also as will be more fully described in connection with FIG. 4.

For a steady state signal condition the resistance network included in the adjustment unit 56 provides a conductive bypass path for the signal around the capacitor 58, applying the error signal directly to the summing junction 60. Closing the switch 62*a* applies the signal at the summing junction 60 directly to the common input lead 12 of the time-shared amplifier 2. The switch 62*b* is closed in synchronous relation with the operation of switch 62*a*, thereby connecting the common output lead 14 of the amplifier 2 to the memory unit 64. The details of the memory unit 64 will be more fully set forth in connection with the description of FIG. 5.

As in the other scanning points in the system, the switches 62*a* and 62*b* are closed for a relatively short period and are then reopened. Notwithstanding the momentary application of the signal to the memory unit 64, the output of the memory unit 64 is held substantially constant during the interval until such time as a new signal is applied thereto. The output signal from the memory unit is applied to the output amplifier 66, thence to a utilization or load device indicated at 67 and which may comprise a final valve actuator or other control device for the process. The construction of the output amplifier 66 is more fully shown in FIG. 6. The output of the memory unit 64 is also applied by the conductor 68 through the proportional band adjustment means and the rate circuit indicated schematically at 70 and thence through the feedback capacitor 72 to the summing junction 60. The inclusion of the memory 48 in the output of the signal conversion loop, producing a constant signal to the input of the error unit 54, together with the inclusion of the memory unit 64 in the output circuit of the controller loop 53, resulting in a continuous output signal, provides means whereby the proportional band function, the rate function, and the reset function of the controller loop 53 operate to provide so-called three-mode control in substantially the same manner as that set forth in United States Patent No. 3,081,425, by Newbold, which issued Mar. 12, 1963 from a filing date of Aug. 28, 1959, and as more fully described therein.

As was previously mentioned, the functions shown and described in connection with FIG. 1 are merely illustrative. Additional conversion loops and controller loops may be connected in the manner shown to the common input and output leads 12 and 14, respectively, of the time-shared amplifier. The switches which control the sequential connection of the corresponding input and output circuits to the time-shard amplifier are arranged to be actuated on a cyclically repetitive basis under the control of any suitable switch synchronizing means of known type.

Figure 2:
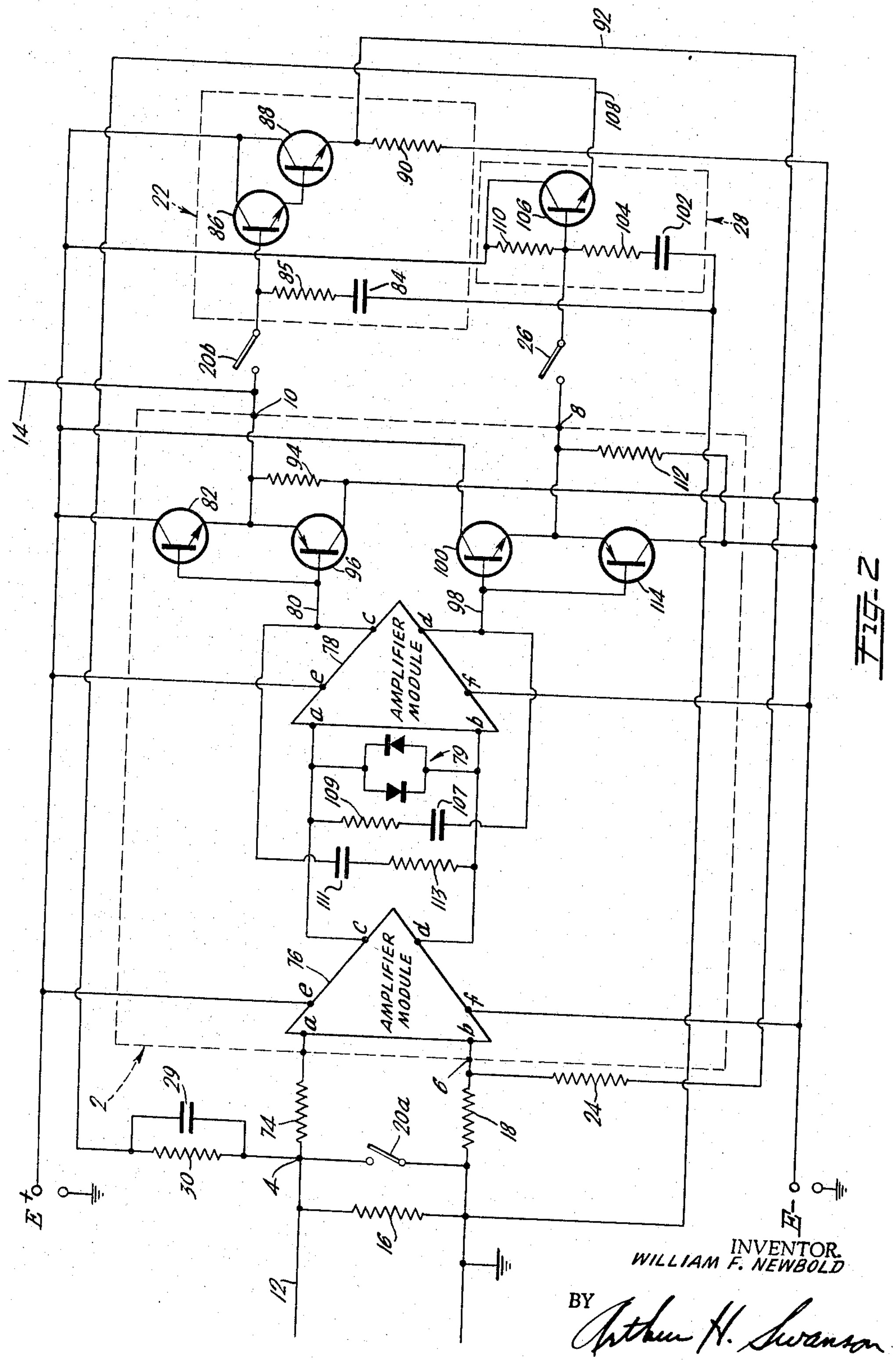
FIG. 2 is a schematic diagram showing in substantially more detail the means for effecting the current and voltage stabilization of the time-shared amplifier in accordance with the present invention.

In FIG. 2 there is shown in greater detail an amplifier circuit suitable for use as the time-shared amplifier 2 of FIG. 1, together with the drift compensating circuitry associated therewith. In FIG. 2, those elements which correspond to similar elements in FIG. 1 are identified with the same reference numerals as those elements in FIG. 1. Thus, the common input lead 12 is connected to the input terminal 4 of the amplifier 2. The amplifier 2 includes a cascade connection of first and second amplifier modules 76 and 78, respectively. Each of the amplifier modules 76 and 78 may comprise amplifier circuitry such as that shown in FIG. 3 to be described hereinafter.

As seen in FIG. 2, the input terminal 4 of the amplifier 2 is connected through a balance resistor 74 to one of the input terminals *a* of the amplifier module 76 while the input terminal 6 of the amplifier 2 is connected to the other of the input terminals *b* of the amplifier module 76. The output terminals *c* and *d* of the amplifier module 76 are connected, respectively, to the input terminals *a* and *b* of the second amplifier module 78. A pair of signal limiting diodes 79 is connected between the input terminals *a* and *b* of module 78.

One output terminal *c* of the second amplifier module 78 is connected by a lead 80 to an output driver stage including a transistor 82, the transistor 82 being connected in an emitter follower configuration with the lead 80 connected to the transistor base. The emitter of the transistor 82 is connected to the output terminal 10 of the amplifier 2 and to the fixed contact of the output switch 20*b*. The collector of the transistor 82 is connected to the positive power supply line E+. The movable blade of the switch 20*b* is connected to the input of the memory unit 22 which includes a storage capacitor 84 connected through a small current limiting resistor 85 to the movable contact of the switch 20*b*. The other side of the capacitor 84 is connected to ground. The movable blade of the switch 20*b* is also connected to the input electrode of a Darlington amplifier comprising transistors 86 and 88. The emitter of the transistor 88 of the Darlington amplifier is connected to a negative power supply line E− through a load resistor 90 while the collectors of the transistors 86 and 88 are connected to the positive power supply line E+. The power supply lines E+ and E− supply suitable voltages of the polarity indicated with respect to ground.

The output of the memory amplifier 22 is taken at the emitter of the transistor 88 and applied in negative feedback relationship by the lead 92 through the resistor 24 to the input terminal 6 of the amplifier 2. The resistors 18 and 24 from a voltage divider for the feedback signal as previously noted.

With reference again to the transistor 82, the emitter thereof is shown also to be connected through a load resistor 94 to the negative power supply line E−. This emitter of transistor 82 is also connected to the voltage output terminal 10 of amplifier 2 and thence to the common output lead 14 which, as previously noted, is adapted for selective connection by the several output switches to the various other memory units. It is noted that if there had previously been a large voltage drift signal which produced a relatively large charge on the capacitor 84, and, if on a subsequent scan a smaller voltage drift signal occurred, the capacitor 84 would be required to discharge through the resistor 94. To facilitate such discharging of the capacitor 84 during the brief interval of closure of switch 20*b*, a transistor 96 is provided. This transistor has its emitter and collector connected across the terminals of the resistor 94 and has its base connected to the base of the transistor 82. Transistor 96, therefore, provides a controlled bypass path for the capacitor 84 around the resistor 94. Consequently, only a brief closure of switch 20*b* is required to permit capacitor 84 to become charged to the correct value representative of the then-existing value of voltage drift signal in the amplifier 2. Specifically, for a voltage drift condition in the amplifier requiring an increase in the charge on capacitor 84, the conduction of transistor 82 is increased, and for a condition requiring a reduction in that capacitor charge, the transistor 96 conduction is increased.

The remaining output terminal *d* of the amplifier modulator 78 is connected by a lead 98 to an output driver stage including a transistor 100 which is connected in an emitter follower configuration, with the lead 98 connected to the transistor base. The emitter of transistor 100 is connected to the output terminal 8 of the amplifier 2 and to the fixed contact of the output switch 26. The collector of transistor 100 is connected to the positive power supply line E+. The movable blade of the switch 26 is connected to the input of the memory unit 28 which, as shown, includes a storage capacitor 102, one side of which is connected to ground and the other side of which is connected through a small current limiting resistor 104 to the movable contact of the switch 26. The said other side of the capacitor 102 is also connected through the resistor 104 to the input electrode or base of a transistor 106.

The output of the memory amplifier 28 is taken at the emitter of the transistor 106 and applied in negative feedback relationship by lead 108 resistor 30 to the common input lead 12 and thence through to the input terminal 4 of amplifier 2. A resistor 110 is connected between the base and the collector of transistor 106. This collector is connected to the positive power supply line E+. The return connection of the emitter of transistor 106 to the remaining or grounded side of its power supply is made by way of the lead 108, the resistor 30 and the resistor 16. The resistors 30 and 16 form a voltage divider for the feedback signal from the memory unit 28.

With reference again to the transistor 100, the emitter thereof is shown also to be connected through a load resistor 112 to the negative power supply line E—. It is noted that if there had previously been a large current drift signal which produced a relatively large charge on the capacitor 102; and, if on a subsequent scan a smaller drift signal occurred, the capacitor 102 would be required to discharge through the resistor 112. To facilitate such discharging of the capacitor 102 during the brief interval of closure of switch 26, a transistor 114 is provided. This transistor has its emitter and collector connected across the terminals of the resistor 112 and has its base connected to the base of the transistor 100. The transistor 114, therefore, provides a controlled bypass path for capacitor 102 around the resistor 112. Consequently, only a brief closure of switch 26 is required to permit capacitor 102 to become charged to the correct value represented by the then-existing value of current drift signal in the amplifier 2. Specifically, for a current drift condition in the amplifier requiring an increased charge on the capacitor 102, the conduction of transistor 100 is increased, and for a condition requiring a decrease in the capacitor charge, the transistor 114 conduction is increased.

As shown, terminals *e* of modules 76 and 78 are both connected to the positive power supply line E+, and the terminals *f* of each of these modules are connected to the negative power supply line E—. These connections supply energizing voltage to the modules 76 and 78 as shown in greater detail in FIG. 3.

For the purpose of shaping the frequency response characteristic of the time-shared amplifier 2 to make this characteristic commensurate with the requirements of the time-sharing aspects of the overall control system, a series connected negative feedback capacitor 107 and resistor 109 are connected between the output terminal *d* and the input terminal *a* of the amplifier module 78. Similarly, a negative feedback capacitor 111 and a resistor 113 are connected in series between the amplifier output terminal *c* and amplifier input terminal *b* of the amplifier module 78.

Figure 3:
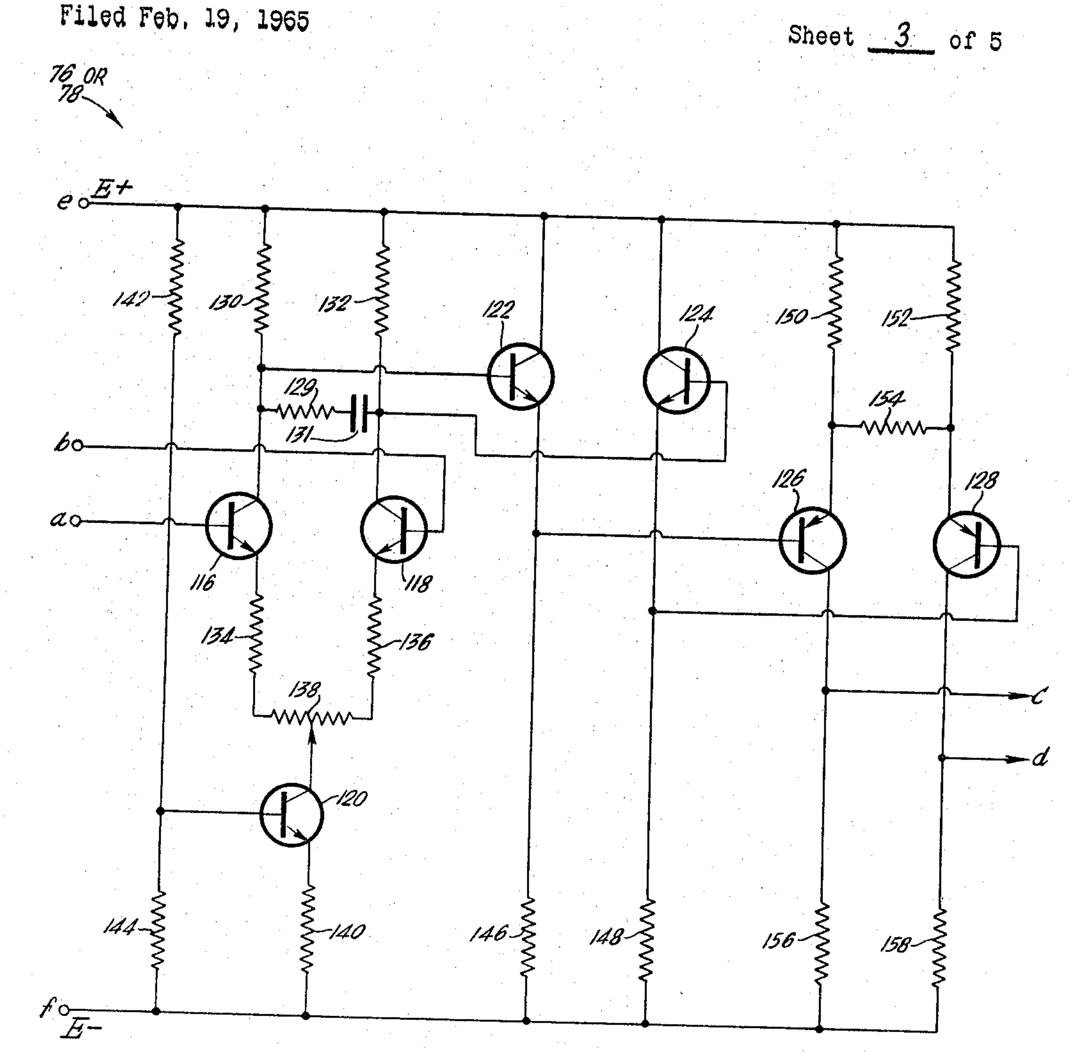
FIG. 3 is a schematic diagram showing details of an amplifier construction suitable for use in the circuit schematically shown in FIG. 2.

Each of the amplifier modules 76 and 78 of the time-shared amplifier 2 may well take the form illustrated by way of example in FIG. 3. The amplifier illustrated in FIG. 3 is a differential direct-coupled direct current amplifier suitable for amplifying low level direct voltage signals. As shown, this amplifier includes input transistors 116 and 118, a stabilizing transistor 120, intermediate transistors 122 and 124, and output transistors 126 and 128. Power is supplied to all of these transistors from the power supply lines E+ and/or E— by way of the power supply terminals *e* and *f*. As shown, the input terminals *a* and *b* of the amplifier are connected to the bases of the respective transistors 116 and 118. The collectors of each of the transistors 116 and 118 are connected through respective load resistors 130 and 132 to the positive supply line E+. A resistor 129 is connected in series with a capacitor 131 between the collectors of the transistor 116 and 118 to cause the FIG. 3 amplifier to have a frequency response characteristic commensurate with the requirements of the time-sharing aspects of the overall control system. The emitters of the transistors 116 and 118 are connected together by a series circuit consisting of fixed resistors 134 and 136 which have their ends remote from the emitters connected together by means of a potentiometer 138. The slider of the potentiometer 138 is connected to the collector of transistor 120 which has its emitter connected by a resistor 140 to the negative power supply line E—. The base of transistor 120 is connected to the junction of resistors 142 and 144 which are connected in series between power supply lines E+ and E—.

The bases of the intermediate transistors 122 and 124 are connected respectively to the collectors of the input transistors 116 and 118. The collectors of transistors 122 and 124 are directly connected to the power supply line E+. The emitters of transistors 122 and 124 are connected by a respective resistor 146 and 148 to the negative power supply line E— and are connected to the bases of the respective output transistors 126 and 128. The emitters of transistors 126 and 128 are connected through respective resistors 150 and 152 to the positive power supply line E+ and are connected to each other by a resistor 154. The collectors of transitors 126 and 128 are connected by a respective resistor 156 and 158 to the negative power supply line E— and are connected to a respective output terminal *c* and *d* of the amplifier module. As shown, transistors 116, 118, 120, 122 and 124 are of the so-called NPN type while the output transistors 126 and 128 are of the PNP type. Inasmuch as the amplifier diagrammatically illustrated in FIG. 3 is of a well-known type, no detailed description of its operation is deemed necessary, nor given.

Figure 4:
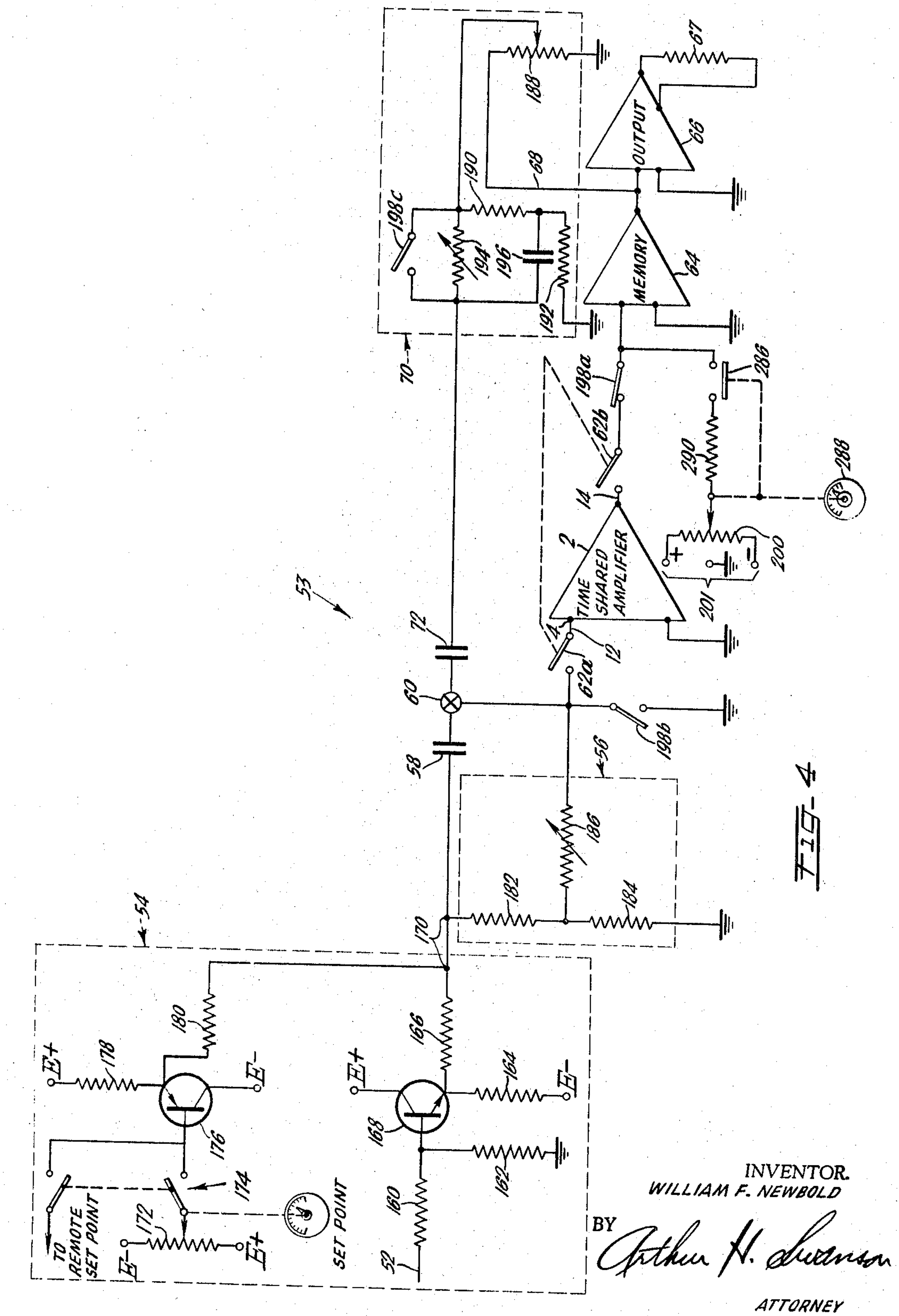
FIG. 4 is a schematic diagram of a single control loop illustrated in cooperative relationship with the time-shared amplifier and illustrating a feature of the present invention.

The control loop 53 of FIG. 1 is illustrated in greater detail in FIG. 4. Thus, the error unit 54 is shown to comprise a process variable input channel including resistors 160, 162, 164 and 166 and a transistor 168. In this channel the input or process variable lead 52 from the memory unit 48 is connected to one terminal of the resistor 160 the other terminal of which is connected to one terminal of resistor 162 and to the base of transistor 168. The other terminal of resistor 162 is connected to ground. The collector of transistor 168 is connected to the positive power supply line E+, while the emitter of the transistor is connected through the resistor 164 to the negative power supply line E—. The emitter of this transistor is also connected through the resistor 166 to a junction 170 which, in turn, is connected to the capacitor 58 and to the input of the reset adjustment device 56.

The error unit 54 also includes a local setpoint channel comprising a potentiometer 172 having a slider which is connected through a setpoint selector switch 174 to the base of a transistor 176. The potentiometer 172 is connected between the power supply lines E+ and E—. The emitter of transistor 176 is connected through a resistor 178 to the positive power supply line E+ and is also connected through a resistor 180 to the junction 170. The collector of transistor 176 is connected directly to the negative power supply line E−. Therefore, when the switch 174 is in the local setpoint position in which the slider of potentiometer 172 is connected to the base of the transistor 176, a setpoint voltage is applied to the junction 170 and together with the voltage derived from the process variable combines to form an error signal at the junction 170.

Upon adjustment of the sepoint switch 174 to the remote setpoint position, the potentiometer 172 is disconnected from the transistor 176 and a remotely located but corresponding potentiometer is connected by the switch 174 to the transistor 176.

As seen in FIG. 4, the reset adjustment unit 56 includes series connected resistors 182 and 184 which are connected between the junction 170 and ground, and an adjustable resistor 186 which has one end connected to the junction of resistors 182 and 184. The other end of the resistor 186 is connected to the summing junction 60. The remaining terminal of capacitor 58 is also connected to the summing junction 60 as is also shown in FIG. 1.

The proportional band plus rate adjustment unit 70, as seen in FIG. 4, includes a proportional band adjusting potentiometer 188 which is connected between the memory unit output feedback lead 68 and ground and has a slider which is connected through serially-connected resistors 190 and 192 to ground. The slider is also connected through an adjustable resistor unit 194 and the capacitor 72 to the summing junction 60. A rate capacitor 196 is connected across the adjustable resistor 194 and the resistor 190. Adjustment of the resistor 194 permits adjustment in the value of rate action supplied by the unit 70.

A section **198*a* of an automatic-manual control switch, to be described in more detail hereinafter, is inserted between the output of the time-shared amplifier 2 and the input of the memory unit 64. When the switch section 198*a* is in its automatic or closed position, the common output lead 14 of the amplifier 2 is adapted for connection by the switch 62*b* to the input of the memory unit 64. Upon adjustment of the switch section 198*a* to its manual control or open position, the input of the memory unit 64 is disconnected from the common output lead 14. When the system is adjusted for operation under manual control, the input of the memory amplifier 64 is adapted to be connected to a manual control potentiometer 200 in a manner which will be described in more detail hereinafter. The potentiometer 200, as shown, is energgized from the terminals 201 of a suitable source of D.C. voltage, which source has a grounded center tap to permit voltages at the slider of either polarity with respect to ground to be applied to the input of the memory unit 64**.

Figure 5:
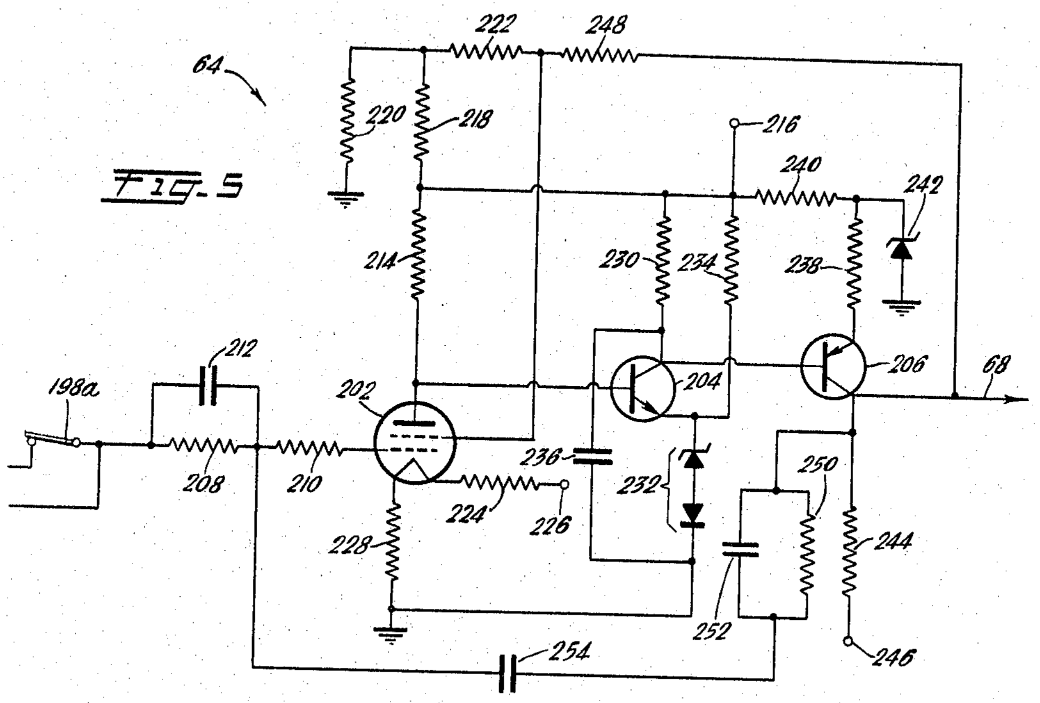
FIG. 5 is a schematic diagram of the memory unit embodied in the control loop shown in FIGS. 1 and 4.

The memory unit 64 embodied in the control loop 53 of FIGS. 1 and 4 is illustrated schematically in FIG. 5. From FIG. 5 it is seen that the memory unit 64 includes a so-called electrometer tube 202 and associated transistors 204 and 206. The input from the manual-automatic control switch **198*a* is connected to the control grid of the tube 202 through series connected resistors 208 and 210, the former of which is shunted by a capacitor 212. The resistor 210 provides a desired grid current limiting action. The plate of tube 202 is connected through a resistor 214 to the positive terminal 216 of a suitable voltage source, the negative terminal of which source is connected to ground. The positive terminal 216 is connected to ground through voltage dividing resistors 218 and 220. The junction of resistors 218 and 220 is connected through a screen grid resistor 222 to the screen grid of tube 202. The filamentary cathode of the latter is supplied with energizing voltage by being connected through a resistor 224 to the positive terminal 226 of a suitable source of filament supply voltage and by being connected by a resistor 228** to the negative and grounded terminal of that voltage supply.

The output of tube 202 is applied to the input of transistor 204 and the output of the latter is applied to the input of transistor 206. Specifically, the plate of tube 202 is directly connected to the base of transistor 204 and the collector of the latter is connected to the base of the transistor 206. The collector of transistor 204 is also connected through a resistor 230 to the positive voltage supply terminal 216 and the emitter of that transistor is connected through a compensated Zener diode 232 to the grounded negative voltage supply terminal. The emitter of transistor 204 is also connected through a resistor 234 to the positive voltage supply terminal 216. A capacitor 236 is connected between the collector of transistor 204 and ground. It is seen that the two transistors 204 and 206 are connected in a conventional complementary, common-emitter fashion to provide the needed high current gain. Capacitor 236 is a frequency stabilizing capacitor to prevent oscillation of the memory unit 64.

The emitter of transistor 206 is connected through resistors 238 and 240 to the positive voltage supply terminal 216. The junction of resistors 238 and 240 is connected through a Zener diode 242 to ground. Diode 242 provides a desired power supply decoupling action. The collector of transistor 206 is connected through a resistor 244 to a negative voltage supply terminal 246 of a suitable voltage supply having a positive terminal connected to ground. The collector of transistor 206 is also connected through a resistor 248 to the screen grid of tube 202. The collector of transistor 206 is also connected through a parallel connected resistor 250 and capacitor 252 and through a memory capacitor 254 to the junction of resistors 208 and 210 in the input circuit of the electrometer tube 202. Additionally, the output lead 68 of the memory unit 64 is connected to the collector of transistor 206. Resistors 248 and 222 cooperate to form a feedback divider which provides a desired direct current negative feedback stabilization of the memory unit 64. The relative values of the resistors 248 and 222 determine the overall direct current gain of the memory unit. Temperature stabilization is provided by the direct current negative feedback arrangement just described. Additional temperature stabilization is achieved by the complementary connection of transistors 204 and 206.

In operation, the momentary application of the amplified error signal to the input of the electrometer tube 202 is effective to produce on the the output lead 68 of the memory device 64 a voltage representative of the amplified error input signal, which voltage is held substantially constant during the scanning interval until such time as a new error input signal is applied to the input of tube 202 by reclosure of output switch **62*b*. To that end, the values of the several components of the memory unit 64 including the value of a capacitor 254** are so chosen as to provide the desired memory time constant.

In a preferred embodiment of the apparatus the frequency of sampling of each function or process variable or rate of connection thereof to the time-shared amplifier 2 is relatively high, and by way of example, may be four times per second. As a consequence, for such automatic control operation, a memory unit 64 having a relatively short time constant would be expected to be satisfactory. Since manual control operation is also contemplated, however, it is noted that the memory unit 64 may be called upon to hold its output constant for long periods of time, for example hours. The memory unit 64, therefore, must be capable of maintaining its output substantially constant for such long periods of time. This requires that there shall be little or no leakage of the charge from the memory capacitor 254. By the use of an electrometer tube as the tube 202, which tube has very high impedance due to the low grid current, the leakage of current from capacitor 254 by the input of the memory unit 64 is reduced to an insignificant value and avoided for all practical purposes.

The desirability of employing transistors as amplifying elements in the memory unit 64 leads to the problem of matching the high output impedance of the electrometer tube 202 to the low input impedance of transistor 204. By means of the arrangement illustrated in FIG. 5, this matching is facilitated. Simply stated, the Zener diode 232 is utilized to hold the emitter of transistor 204 and the base of this transistor and the plate of the tube 202 at a substantially constant voltage. Consequently, a small change in the voltage applied to the control grid of tube 202 provides a large change in the division of the current between tube 202 and transistor 204, as is desired. The value of resistor 214 is made large so that a nearly constant total current is supplied to the tube 202 and transistor 204.

The values of the parallel-connected resistor 208 and capacitor 212 are so chosen as to cause the memory unit 64 to have a frequency response characteristic commensurate with the requirements of the time-sharing aspects of the overall apparatus. Contributing to this desired frequency response is the proper selection of the values of the parallel-connected resistor 250 and the capacitor 252. Specifically, the values of these components are so chosen that the memory unit 64 performs properly in conjunction with the time-shared amplifier 2 during the brief interval that the time-shared amplifier 2 is connected to each of the process variables or functions that are under measurement and control.

Figure 6:
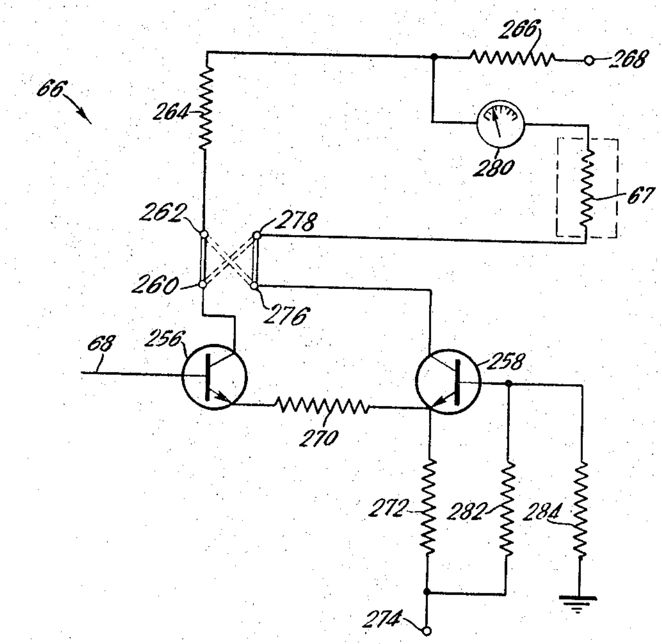
FIG. 6 is a schematic diagram of an output amplifier embodied in the control loop illustrated in FIGS. 1 and 4.

FIG. 6 is a schematic diagram of the output amplifier 66 which is embodied in the control loop 53 illustrated in FIGS. 1 and 4. As shown, the output amplifier 66 includes two transistors 256 and 258 connected in a differential configuration, and associated components to be described. The output lead 68 of the memory unit 64 is connected, as shown, to the base of the transistor 256 while the collector of the latter is connected through jumpered terminals 260 and 262 and resistors 264 and 266 to the positive terminal 268 of a suitable source of voltage having its negative terminal grounded. The emitter of transistor 256 is connected through resistors 270 and 272 to the negative terminal 274 of a suitable source of voltage supply, the positive terminal of which is connected to ground. The junction of resistors 270 and 272 is connected to the emitter of transistor 258, the collector of which is connected to the positive voltage supply terminal 268 through a series circuit including jumpered terminals 276 and 278, a resistor constituting the utilization device or load 67 of the control loop 53, a so-called output or valve current meter 280 and the resistor 266. The base of transistor 258 is connected by a resistor 282 to the negative voltage supply terminal 274 and is also connected by a resistor 284 to ground.

With the circuit connected as shown in FIG. 6, a change in the input voltage to the output amplifier 66 in a given direction will produce a change in a given direction in the current through the device 67. If it is desired to have the last-mentioned current change in the opposite direction for a change in the same direction in the input voltage, the jumper from terminal 262 is removed from terminal 260 and connected to the terminal 276 while the jumper from terminal 278 is removed from terminal 276 and connected to terminal 260. This places the load or utilization device 67 and the meter 280 in the collector circuit of transistor 256 and removes those components from the collector circuit of transistor 258. Simultaneously, the resistor 264 is removed from the collector circuit of the transistor 256 and is placed in the collector circuit of transistor 258. The purpose of resistor 264 is that of a protective device for the transistor which does not have the load device 67 and meter 280 connected in its collector circuit, that is, to reduce the power dissipation in the collector circuit of that transistor. The resistor 266 also provides a desirable protective action in that it assures resistance in the transistor power supply circuit in the event of short-circuiting or grounding of the load device 67 over the leads connected thereto.

As noted hereinbefore, the control system described may be selectively operated in an automatic or manual mode, as desired. When the system is adjusted to be operated in its automatic mode, the switch section **198*a* is in its closed position, as shown in FIG. 4. Upon adjustment of the system to its manual mode of operation, the switch section 198*a* is opened. The automatic-manual switch also has a switch section 198*b* which is connected between the summing junction 60 and the input of time-shared amplifier 2 and ground, and also has a switch section 198*c* which is connected in parallel with resistor 194 included in the proportional band plus rate adjustment unit 70. Switch sections 198*b* and 198*c* are opened during the automatic mode of operation of the system when the switch section 198*a* is closed. When the system is placed in the manual control condition, the switch section 198*a* is opened and the switch sections 198*b* and 198*c*** are closed.

When the three sections of the manual-automatic switch are adjusted to their manual control positions the value of the operating current through the utilization or load device 67 may be varied by adjustment of the slider along the manual control potentiometer 200. Cooperating with the slider of the potentiometer is a normally open momentary contact 286 which is held in closed position only during the time that spring-loaded knob 288 is rotated to adjust the position of the slider along the length of potentiometer 200 away from a central position, as shown. The slider is spring returned so that normally it is maintained in a central position and is returned to that position upon release of the knob 288. Meanwhile, however, the adjustment of the slider along the length of potentiometer 200 is effective to apply to the input of the memory unit 64 a voltage as required to produce the desired operating current through the utilization or load device 67. A resistor 290 connected in series between the slider and switch 286 is provided to adjust the time constant or response of the memory unit to a change in position of the slider along the length of the potentiometer 200 and thereby the rate of change of current through the utilization or load device 67 for a given change of position of the slider along the length of the potentiometer. The resistance element of potentiometer 200 is desirably made non-linear so that movement of the slider in the vicinity of its zero center position provides a fine adjustment of the manual control voltage while movement of the slider in the vicinity of either end of the potentiometer element provides a greater rate of change of manual control voltage for a given movement of the knob 288 and the slider.

As noted, switch 286 normally is in an opened position. As a consequence, adjustment of switch section **198*a* from its automatic to its manual position produces no change in the input of memory unit 64 and thereby no change in the current value through the utilization of load device 67. This provides so-called bumpless switching from the automatic to the manual condition of the apparatus without requiring any particular adjustment of the manual potentiometer 200**. This is a practically important feature in a modern industrial process control system.

After the switch section **198*a* has been opened, the knob 288 may be manipulated to effect the application of a direct current voltage from the potentiometer 200 to the input of the memory unit 64 in accordance with the desired actuation of the utilization or load device 67. If desired, the switch 286 may be omitted and the same switching action may be achieved by arranging the slider of the potentiometer 200 to be normally out of engagement with the potentiometer element and to be brought into such engagement only upon rotation of the spring loaded knob 288. Also, if desired, an interlock arrangement not shown may be provided to prevent application of a manual control voltage to the memory unit 64 prior to the opening of the switch section 198***a*.

As was previously noted, the opening of switch section 198*a* is accompanied by closure of the switch sections 198*b* and 198*c*. The closure of the switch section 198*b* grounds the summing junction 60 while closure of switch 198*c* short circuits the rate adjustment resistor 194. Subsequent adjustment of the slider along the length of the potentiometer 200 produces a change in the output voltage from memory unit 64 and thereby on the lead 68 in the output of the memory unit. This change in the voltage on the output lead 68 changes the charge on the capacitor 72 and also on capacitor 196 in the proportional band and rate unit 70. The charges on capacitors 72 and 196 are thus made to follow and to be in accord with the manually adjusted current in the utilization or load device 67. At the same time the charge on capacitor 58 is permitted to follow the error signal at the output of the error unit 54 which error signal will vary in accordance with the manually adjusted control current in the utilization or load device 67 as the latter affects the value of the process variable under measurement and control.

Consequently, upon adjustment of the system from its manual to its automatic mode of operation, which is effected by manipulation of the switch sections 198*b* and 198*c* to their open positions and the adjustment of switch section 198*a* to its closed position, no voltage difference appears at the summing junction 60, and therefore, there is no voltage present at the input to the time-shared amplifier 2. That is to say, the opening of the switch section 198*b* does not cause any change in the voltage of summing junction 60 with respect to ground as the charges on the various capacitors mentioned are such as to cause no voltage difference between summing junction 60 and ground, even with the switch 198*b* opened. Accordingly, no disturbance is introduced into the system as result of the adjustment of the system from its manual to its automatic mode of operation. Thus, the switching from manual to automatic modes of operation also is effected in a so-called bumpless manner.

If, as a result of the manual control operation, the value of the process variable is not at the desired setpoint value, subsequent operation of the system in its automatic mode of operation will be such as to cause the reset action to effect a smooth return of the process variable to the desired set point value. This desired operation is obtained without any need for any special action on the part of an operator for balancing the system.

It should be clear from the foregoing that there has been disclosed an improved process control system wherein a single high quality electronic amplifier is utilized in a time-sharing manner with a plurality of measuring and controlling loops, the latter providing so-called three-mode control, and wherein switching between manual and automatic modes of operation is effected without introducing upsets or disturbances. The disclosed apparatus also includes a novel electronic memory circuit which cooperates in a novel way with the system in both the manual and automatic modes of operation.

What is claimed is:

1. A system including an electronic amplifier having an input including at least one input terminal and an output including at least one output terminal and a common terminal common to said input and output terminals, a plurality of input signal source means each including a pair of input terminals, a separate static memory unit individually associated with each of said input signal source means, each of said memory units having an input and and output terminal, an electronic connection from the output terminal of each of said memory units to one terminal of said pair of input terminals of said input signal source means associated therewith, a plurality of output signal means individually connected to the output terminal of each of said memory units, and a plurality of switching means connected to said amplifier input terminal and said amplifier output terminal for sequentially and repetitively connecting the second input terminal of each of said input signal source means to said amplifier input terminal and connecting the input terminal of each of said memory units individually associated therewith to said amplifier output terminal thereby applying signals from said input signal source means to said memory units and to said output signal means connected thereto through said electronic amplifier on a time-shared basis and storing said applied signal from said input signal source means within said associated memory units when said electronic amplifier is not connected to an individual memory unit and output signal means.

2. A combination as specified in claim 1 wherein said electronic amplifier additionally comprises, a second amplifier input terminal, a source of reference potential, said switching means operative in one state effectively to connect said first mentioned amplifier input terminal to said reference potential, a voltage dividing circuit, a memory unit having first and second terminal means and said first terminal means connected to said second amplifier input terminal through said voltage divider circuit, and said switching means connecting said second terminal means of the last mentioned memory unit to said amplifier output terminal when said switching means is in said one state, thereby to compensate said electronic amplifier for voltage drift characteristics.

3. A combination as specified in claim 1 wherein said electronic amplifier additionally comprises a second amplifier output terminal, an additional memory unit having first and second terminal means, a feedback connection from the first terminal means of said additional memory unit to said amplifier input terminal, and an additional switch means effective, when said switching means is ineffective to connect said first mentioned amplifier output terminal to the input terminal of any of the first mentioned memory units, to connect said second amplifier output terminal to said second terminal means of said additional memory unit, thereby to compensate said electronic amplifier for current drift characteristics.

4. A difference amplifier inclding first and second channels having a common connection to a source of reference potential, each channel having an input and an output terminal, and means to compensate for voltage drift characteristics of said amplifier comprising static memory means having first and second terminal means, resistor means, a feedback connection including said resistor means from said first terminal means of said memory means to the input terminal of said first channel, and switching means momentarily to connect the output terminal of said second channel to said second terminal means of said memory means and to connect the input terminal of said second channel to said source of reference potential.

5. A difference amplifier including first and second channels having a common connection to a source of reference potential, each channel having an input and an output terminal, and means to compensate for current drift characteristics of said amplifier comprising static memory means having first and second terminal means, resistor means, means to maintain a substantially constant voltage on the input terminal of said first channel connected between said source of reference potential and said terminal, a feedback connection including said resistor means from said first terminal means of said memory means to the input terminal of said second channel, and switching means momentarily to connect the output terminal of said first channel to said second terminal means of said memory means.

6. A difference amplifier including first and second channels having a common connection to a source of reference potential, each channel having an input and an output terminal and means to compensate for voltage and current drift characteristics of said amplifier comprising static voltage memory means having a first and second terminal means, voltage feedback resistor means, a voltage feedback connection including said voltage feedback resistor means from said first terminal means of said voltage memory means to the input terminal of said first channel, static current memory means having first and second terminal means, current feedback resistor means, a current feedback connection including said current feedback resistor means from said first terminal means of said current memory means to the input terminal of said second channel, and switching means operative in a first condition to connect the output terminal of said second channel to said second terminal means of said voltage memory means and to connect the input terminal of said second channel to said source of reference potential, said switching means operative in a second condition to connect the output terminal of said first channel to said second terminal means of said current memory means.

7. A system including an electronic amplifier having an input lead and an output lead, a plurality of input signal source means having terminal means, static memory units individual to each of said input signal source means, each memory unit having an input and an output, a plurality of pairs of switching means, one switching means of each pair being operative to connect one of said terminal means of said input signal source means to said input lead and the other switching means of each pair being operative to connect said input of said individual memory units to said output lead, said pairs of switching means being arranged to successively and repeatedly connect each of said input signal source means and said individual memory units to said input lead and said output lead, an electrical feedback connection from the output of the said individual memory units to another of said terminal means of the input signal source means individually associated therewith, an individual utilization device connected to the output of each of said memory units, a second one of said input signal source means arranged as an individual utilization device to receive an input signal from a first of said memory units, said second input signal source means including error means to compare said received input signal to a reference for deriving an error signal, reset means to receive said error signal and provide a reset signal which gradually changes with respect to time, said reset means connected to said switching means which connects said second input signal source means to said input lead, and rate means connected in said electrical feedback connection between the output of a second memory unit individually associated said second input signal source means and said connection of said reset means and said switching means.

8. A combination as specified in claim 7 including a manually actuable potential adjusting means to produce an input to said second memory unit thereby to permit manual actuation of the said utilization means, connected to the output thereof, and further switching means actuable to connect the input of said second memory unit either to the output of said electronic amplifier or to said manually actuable potential adjusting means, said further switching means including means to deactivate said rate means in said feedback connection and to connect said connection of said reset means and said switching means to a point of potential which is fixed with respect to the input and output of said amplifier.

9. A combination as specified in claim 8 wherein said manually actuable potential adjusting means is biased to normally produce a zero input to said second memory unit when initially connected thereto by said further switching means, whereby the shifting of said further switch means from automatic control, where it connects to said electronic amplifier, to manual control, where it connects to said manually actuable potential adjusting means, and back again is effected without disturbing said utilization device.

10. A system including an electronic amplifier having an input and an output, an input lead, an output lead connected to said amplifier output, a plurality of input signal source means on which stray fluctuating signals may be superimposed, a memory unit individually associated with each of said input signal source means, each of said memory units having an input and an output, an electrical energy storage device individually associated with each of said input signal source means, switching means operable successively and repeatedly to connect each of said input signal source means to apply a charge to its individually associated electrical energy storage device and synchronously to apply the charge so stored to said input lead and to connect the input of its individually associated memory unit to said output lead, a feedback connection from the output of each of said memory units to the individually associated one of said input signal source means, a second input lead connected to the input of said amplifier, further stray-free input signal source means arranged to be connected by said switching means to said second input lead, and additional switching means selectively operable to connect the first mentioned input lead to said second input lead when one of said energy storage devices is connected to said first mentioned input lead.

11. A process control system, comprising a memory unit having an input and an output and including an amplifier and memory means, input signal source means, manually actuable potential adjusting means having an output terminal and operative while being manually actuated to produce at the last-mentioned output terminal a signal dependent upon the extent of such actuation, switching means selectively adjustable between a first condition in which it connects said input signal source means to said memory unit input, and a second condition in which it instead connects said output terminal of said manually actuable potential adjusting means to the last-mentioned input, and a utilization device connected to said memory unit output and responsive to signals applied to said memory unit input, said manually actuable potential adjusting means including actuating means to produce a zero signal at said output terminal of said manually actuable means whenever the latter is not being manually actuated, thereby to prevent the adjustment of said switching means from disturbing said utilization device.

12. A process control system, comprising a memory unit having an input and an output and including an amplifier and memory means, input signal source means, manually actuable potential adjusting means having an output terminal and operative while being manually actuated to produce at the last-mentioned output terminal a signal dependent upon the extent of such actuation, switching means selectively adjustable between a first condition in which it connects said input source means to said memory unit input, and a second condition in which it instead connects said output terminal of said manually actuable potential adjusting means to the last-mentioned input, a utilization device connected to said memory unit output and responsive to signals applied to said memory unit input, said manually actuable potential adjusting means including actuating means to produce a zero signal at said output terminal of said manually actuable potential adjusting means whenever the latter is not being manually actuated, thereby to affect adjustment of said switching means from said first condition to said second condition without disturbing said utilization device until manual actuation of said manually actuable potential adjusting means, an electrical feedback connection having capacitance means therein, said switching means including further switching means for connecting said feedback connection between said memory unit output and said input signal source means when said switching means is in said first condition and for connecting said feedback connection between said memory unit output and a point of potential which is fixed with respect to said input and output of said memory unit when said switching means is in said second condition, whereby adjustment of said switching means from said second condition back to said first condition is affected without disturbing said utilization device due to said capacitance means within said feedback connection.

13. A process control system including a memory amplifier having an input and an output and including memory capacitance means connected in a feedback arrangement therewith;

input signal source means;

manually actuable potential adjusting means having an output terminal and including impedance means, energy means connected to said impedance means, actuating switch means connecting said impedance means of said manually actuable potential adjusting means to said output terminal for producing at said output terminal a signal which is proportional to the extent of actuation of said actuating switch means, reference means connected to said impedance means of said manually actuable potential adjusting means for producing a zero signal at said output terminal whenever said actuating switch means is not being manually actuated; and switching means selectively adjustable between a first condition in which it connects said input source means to said memory amplifier input and a second condition in which it instead connects said output terminal of said manually actuable potential adjusting means to said input, said memory amplifier being unaffected by said manually actuable potential adjusting means when said switching means is placed in said second condition until said actuating switch means is manually actuated.

14. A process control system as claimed in claim 13 wherein said actuating switch means includes a zero center position where it contacts said reference means and a fine adjustment thereof in the vicinity of said zero center position provides a proportionally small signal at said output terminal of said manually actuable means while adjustment of said actuating potential adjusting switch means in the vicinity of the adjustment limits thereof provides a proportionally greater rate of change of the signal at said output terminal of said manually actuable potential adjusting means.

References Cited

UNITED STATES PATENTS

| | | | |
|---|---|---|---|
| 3,331,061 | 7/1967 | Marcus | 340—173 |
| 3,336,533 | 8/1967 | Glasser | 330—51 |

NATHAN KAUFMAN, *Primary Examiner.*

U.S. Cl. X.R.

330—1, 51